US012726291B2

(12) United States Patent
Li

(10) Patent No.: US 12,726,291 B2
(45) Date of Patent: Sep. 1, 2026

(54) TRANSMISSION METHOD AND RECEIVER

(71) Applicant: NORDIC SEMICONDUCTOR ASA, Trondheim (NO)

(72) Inventor: Wei Li, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 58 days.

(21) Appl. No.: 18/559,713

(22) PCT Filed: May 9, 2022

(86) PCT No.: PCT/EP2022/062403
§ 371 (c)(1),
(2) Date: Nov. 8, 2023

(87) PCT Pub. No.: WO2022/238287
PCT Pub. Date: Nov. 17, 2022

(65) Prior Publication Data

US 2024/0243831 A1 Jul. 18, 2024

(30) Foreign Application Priority Data

May 10, 2021 (FI) .................................... 20215552

(51) Int. Cl.
*H04J 13/00* (2011.01)
*H04L 1/00* (2006.01)

(52) U.S. Cl.
CPC ........ *H04J 13/0062* (2013.01); *H04L 1/0059* (2013.01); *H04L 1/0061* (2013.01)

(58) Field of Classification Search
CPC .. H04J 13/0062; H04L 1/0045; H04L 1/0059; H04L 1/0061; H04L 5/0048; H04L 25/02; H04L 27/2602; H04L 27/26132
See application file for complete search history.

(56) References Cited

U.S. PATENT DOCUMENTS

2006/0176968 A1 8/2006 Keaney et al.
2008/0049654 A1 2/2008 Otal et al.
(Continued)

FOREIGN PATENT DOCUMENTS

EP 2993848 A1 3/2016
EP 3425839 A1 1/2019

OTHER PUBLICATIONS

Mingzhe Guo, "CRC Aided List Decoding of Convolutional Codes", Sep. 6, 2019, 61 pages, https://www.eit.lth.se/sprapport.php?u id=1190.
(Continued)

*Primary Examiner* — David B Lugo
(74) *Attorney, Agent, or Firm* — Nixon & Vanderhye PC

(57) ABSTRACT

A method and apparatus for transmission are disclosed. The solution comprises forming a frame for transmission, where the frame comprises a header section, a training sequence section, an address and rate section, and a payload section. The training sequence section (202) comprises a given number of first fields (300A, 300B, 300C, 300D) of equal length and a second field (302). The total length of the given number of the first fields is shorter or equal than the length of the second field, the second field (302) comprises a given symbol sequence, and the first field (300A, 300B, 300C, 300D) comprises a part of the same given symbol sequence.

11 Claims, 4 Drawing Sheets

(56) References Cited

U.S. PATENT DOCUMENTS

| | | | | |
|---|---|---|---|---|
| 2009/0276221 | A1 | 11/2009 | Heiman et al. | |
| 2009/0285339 | A1* | 11/2009 | Zhang | H04J 13/10 375/343 |
| 2013/0215997 | A1 | 8/2013 | Lee et al. | |
| 2014/0204928 | A1 | 7/2014 | Sorin | |
| 2019/0007973 | A1* | 1/2019 | Lou | H04W 74/006 |
| 2020/0007373 | A1 | 1/2020 | Lee et al. | |
| 2020/0145157 | A1 | 5/2020 | Suh et al. | |

OTHER PUBLICATIONS

Search Report for FI Application No. 20215552 dated Nov. 30, 2021, 2 pages.

International Search Report and Written Opinion of the ISA for PCT/EP2022/062403 dated Aug. 11, 2022, 17 pages.

* cited by examiner

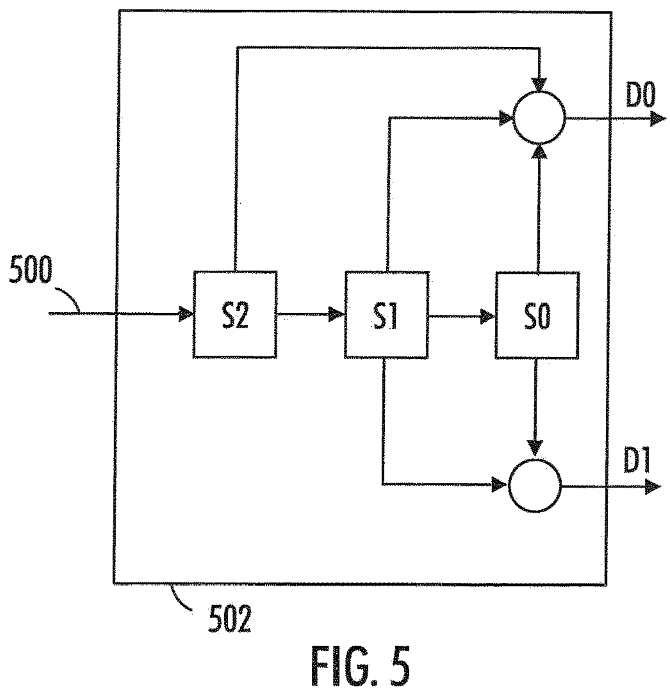
FIG. 5
206
600A
600B
600C
FIG. 6
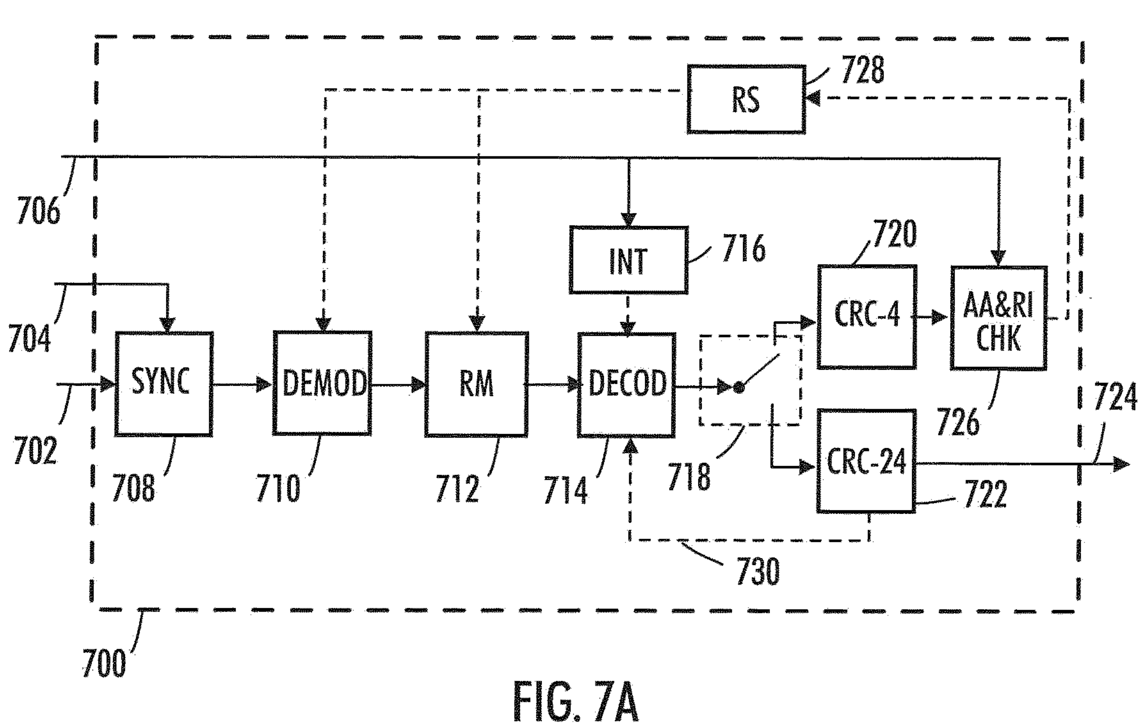
FIG. 7A

TRANSMISSION METHOD AND RECEIVER

CROSS-REFERENCE TO RELATED APPLICATIONS

This application is the U.S. national phase of International Application No. PCT/EP2022/062403 filed May 9, 2022 which designated the U.S. and claims priority to FI 20215552 filed May 10, 2021, the entire contents of each of which are hereby incorporated by reference.

TECHNICAL FIELD

Various example embodiments relate to wireless communications.

BACKGROUND

In communication systems, and in wireless systems in particular, there is a constant need to increase the transmission capacity or throughput of the systems. New services and functions are constantly being developed and higher throughput is needed from communication systems and solutions.

Higher throughput requires new properties from the communication systems and solutions.

BRIEF DESCRIPTION

According to an aspect, there is provided a data transmission method, comprising: forming a frame for transmission, where the frame comprises a header section, a training sequence section, an address and rate section, and a payload section, the training sequence section comprising a given number of first fields of equal length and a second field, where the total length of the given number of the first fields is shorter or equal than the length of the second field, the second field comprising a given symbol sequence, and the first field comprising a part of the same given symbol sequence.

According to another aspect, there is provided a data reception method, comprising: receiving a frame, where the frame comprises a header section, a training sequence section, address and rate section, and a payload section, the payload section consisting of a payload field with one or more packets and a cyclic redundancy check field after each packet, obtaining synchronisation to the received frame utilising the training sequence section comprising a given number of first fields of equal length and a second field, where the total length of the given number of the first fields is shorter or equal than the length of the second field, the second field comprising a given symbol sequence, and the first field comprising a part of the same given symbol sequence, calculating the cyclic redundancy check in a cyclic redundancy check calculator, providing a feedback from the cyclic redundancy check calculator to a convolutional decoder, and decoding the payload in the convolutional decoder utilising the feedback.

According to another aspect, there is provided a transmitter, comprising at least one processor; at least one memory including computer program code; the at least one memory and the computer program code configured to, with the at least one processor, cause the apparatus at least to perform: forming a frame for transmission, where the frame comprises a header section, a training sequence section, address and rate section, and a payload section, forming the training sequence section comprising a given number of first fields of equal length and a second field, where the total length of the given number of the first fields is shorter or equal than the length of the second field, the second field comprising a given symbol sequence, and the first field comprising a part of the same given symbol sequence.

According to another aspect, there is provided a receiver, comprising at least one processor; at least one memory including computer program code; the at least one memory and the computer program code configured to, with the at least one processor, cause the apparatus at least to perform: receiving a frame, where the frame comprises a header section, a training sequence section, address and rate section, and a payload section, the payload section consisting of a payload field with one or more packets and a cyclic redundancy check field after each packet, obtaining synchronisation to the received frame utilising the training sequence section comprising a given number of first fields of equal length and a second field, where the total length of the given number of the first fields is shorter or equal than the length of the second field, the second field comprising a given symbol sequence, and the first field comprising a part of the same given symbol sequence, calculating the cyclic redundancy check in a cyclic redundancy check calculator, providing a feedback from the cyclic redundancy check calculator to a convolutional decoder, and decoding the payload in the convolutional decoder utilising the feedback.

According to another aspect, the given symbol sequence is a Zadoff-Chu sequence.

According to another aspect, the Zadoff-Chu sequence to be used on a connection is selected from a pool of Zadoff-Chu sequences based on the address and rate section and channel identification of the connection.

According to another aspect, the payload section consists of a payload field with one or more packets and a cyclic redundancy check field in each packet.

The aspects provide the technical effect that utilizing the proposed frame structure a high throughput is achieved.

The aspects provide the advantage that in addition to high throughput a good resistance to co-channel interference is achieved.

Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which

FIG. 5 illustrates an example of the structure of an encoder;

FIG. 6 illustrates an example of the structure of the payload section of the frame structure;

FIG. 7A illustrates an example of an arrangement for processing a frame at receiving side;

DETAILED DESCRIPTION OF SOME EMBODIMENTS

The aim to provide higher throughput is common for many communication methods and communication systems. Modern communication methods and systems include the universal mobile telecommunications system (UMTS) radio access network (UTRAN), wireless local area network (WLAN or WiFi), worldwide interoperability for microwave access (WiMAX), personal communications services (PCS), ZigBee®, wideband code division multiple access (WCDMA), systems using ultra-wideband (UWB) technology, sensor networks, mobile ad-hoc networks (MANETs), Bluetooth®, and Internet Protocol multimedia subsystems (IMS) or any combination thereof.

Bluetooth® is a communication method developed especially for short range communication between devices without the support of a special infrastructure. Currently there are two forms of Bluetooth® systems, Basic Rate, BR, and Low Energy, LE. The Bluetooth® LE, or BLE, system was designed for devices which require lower current consumption, lower complexity and lower cost than Basic Rate devices. BR/EDR. The BLE system was originally also designed for use cases and applications with lower data rates. However, it has been noticed that higher throughput is also desirable in BLE connections.

The embodiments of the present invention are not, however, restricted to the Bluetooth® system given as an example but a person skilled in the art may apply the solution to other communication systems provided with necessary properties.

Terminal devices utilizing Bluetooth® communication may support both BR and BLE or either one of the system.

Figure 1:
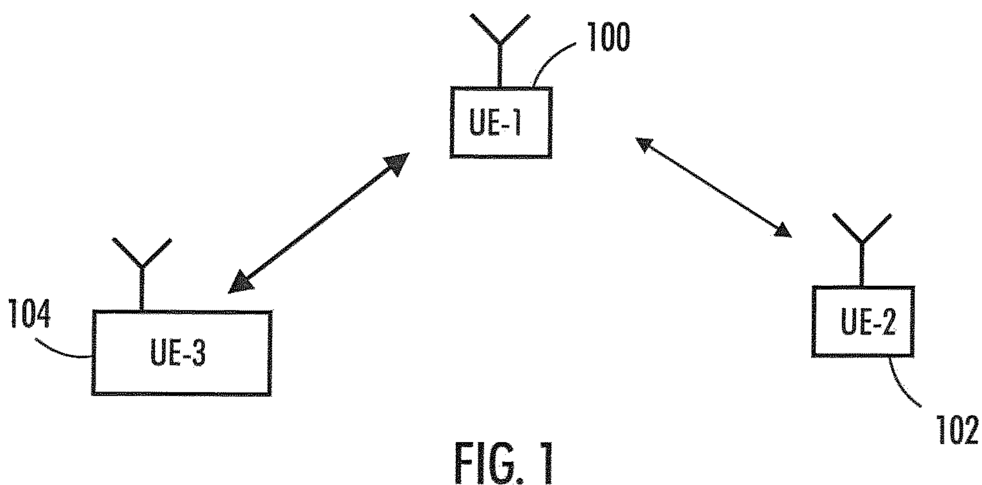
FIG. 1 illustrates an example of communication environment.

FIG. 1 depicts examples of simplified communication environment only showing some elements and functional entities, all being logical units, whose implementation may differ from what is shown. The connections shown in FIG. 1 are logical connections; the actual physical connections may be different.

FIG. 1 illustrates an example of terminal devices utilizing Bluetooth® communication. In the figure, a terminal device 100 is communicating with other terminal devices 102 and 104.

A terminal device typically refers to a mobile or static device (such as a portable or non-portable computing device) that includes wireless mobile communication devices including, but not limited to, the following types of devices: mobile phone, smartphone, personal digital assistant (PDA), handset, laptop and/or touch screen computer, tablet, game console, notebook, and multimedia device. Bluetooth® technology may be used by many types of accessories as well, such as loudspeakers, printers, sensors, cameras, recorders, measurement devices, to name a few.

As linear modulation schemes can achieve high bandwidth efficiency, and thus high throughput, linear modulation schemes are considered to be used in BLE to increase the throughput and link reliability.

With linear modulation schemes, the use of coherent detection is important to increase link reliability. To be able to perform coherent detection, a receiving terminal device should have knowledge of some reference information. The references usually include symbol timing offset, Carrier Frequency Offset, CFO, the starting point of transmission frame, and the Channel State Information, CSI. For Phase Shift Key, PSK, modulation, the CSI refers to the initial phase offset. For Quadrature Amplitude Modulation, QAM, such as 16QAM for example, CSI may also include the amplitude information. In the case of multipath channels, CSI is a channel estimate having multiple complex-valued numbers. To obtain mentioned reference information, a transmitting end may utilise a training sequence in transmission.

Figure 2:
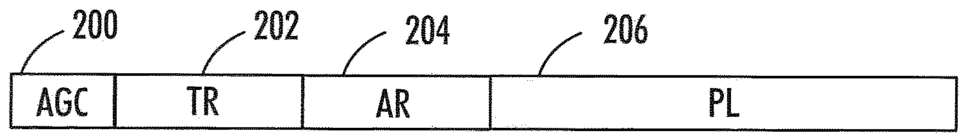
FIG. 2 illustrates an example of a frame structure.

In an embodiment, the frame structure of FIG. 2 is proposed to be used in transmission. The proposed structure enables high throughput and reliability for example in BLE systems.

The frame structure of FIG. 2 comprises four parts, a header section 200, a training sequence section 202, an address and rate section 204 and a payload section 206.

In the beginning of the frame there is the header section 200. The section may comprise a few symbols to setup Automatic Gain Control, AGC. Typically, it is used to let Automatic Gain Control circuit to reach a stable state. The length may of the order of 2 to 8 us, for example, depending on the radio frequency implementation. The length may thus vary depending on where the frame is applied and may also be other than the mentioned values.

After the header, the frame structure comprises a training sequence, TR 202, section. When the receiving end receives the transmitted frame, it can perform the initial frame synchronization based on the training sequence. After the initial synchronization, the receiver may recover the reference information mentioned above.

After the training sequence, the proposed frame structure comprises the address and rate section AR 204. The address and rate section comprises an address field, a rate indicator field and a cyclic redundancy check field.

After the address and rate section the proposed frame structure comprises a payload section PL 206. This section comprises the Medium Access Control, MAC, payload.

Figure 3:
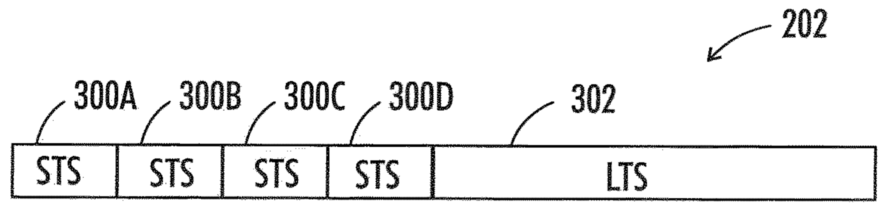
FIG. 3 illustrates an example of the structure of training sequence section of the frame structure.

FIG. 3 illustrates an example of the structure of the training sequence 202 section. In an embodiment, the training sequence comprises a given number of first fields 300A, 300B, 300C, 300D, and a second field 302. The first fields may be denoted as short training sequence, STS, and the second field may be denoted as long training sequence, LTS.

In an embodiment, the total length of the given number of the STSs 300A, 300B, 300C, 300D is shorter or equal than the length of the LTS.

In FIG. 3, the number of first fields or STSs is four, but it may also be other than four.

In an embodiment, the second field or LTS comprises a given symbol sequence, and each of the first fields comprise a part of the same given symbol sequence.

The content of each of the first field or STS may be the same part of the given symbol sequence. The repeated STSs may be used for coarse Carrier Frequency Offset estimation and compensation. In an embodiment, each STS comprises four symbols, thus having the length of 2 us. The use of repeated benefit STSs has the advantage of enabling the Auto-Correlation, AC, based Carrier Frequency Offset estimation and at the same time making the Carrier Frequency Offset estimation more robust against the multipath.

After the STSs, the second field or LTS may be used multiple purposes at the receiving end. The receiving end may get a coarse Carrier Frequency Offset estimate from STSs and compensate the LTS by applying the coarse Carrier Frequency Offset estimate. Further, the symbol timing estimation and the frame starting point estimation may be performed based on the LTS.

The given sequence may be a Zadoff-Chu sequence. However, also other sequences having good autocorrelation properties may be used as the given sequence. Examples of other sequences include Barker codes and pseudo random sequences.

In an embodiment, a 17-symbol Zadoff-Chu sequence i.e.

$$S_k = e^{ik\frac{5k(k+1)}{17}},\ 0 \le k \le 17,$$

may be used as the given sequence.

In an embodiment, the first field or STS comprises the four last symbols of the Zadoff-Chu sequence of the second field or LTS. The advantage of using the four last symbols of the LTS is that in such a case the STSs act as a Cyclic Prefix, CP, of the LTS. This helps to estimate the Channel State Information of the multi-path channel reliably and with low complexity.

In an embodiment, the first field or STS comprises three last symbols and the first symbol of the Zadoff-Chu sequence of the second field or LTS.

The proposed training sequence format has the advantage that it can provide robust synchronization performance.

Figure 4:
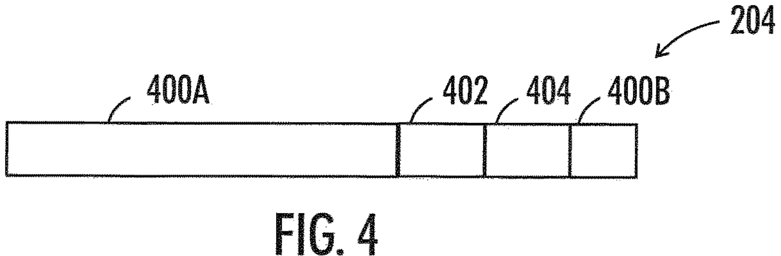
FIG. 4 illustrates an example of the structure of the address and rate section of the frame structure.

FIG. 4 illustrates an example of the structure of the address and rate section 204. The address and rate section comprises an address field, a rate indicator field and a cyclic redundancy check, CRC, field.

In an embodiment, the length of the address field is 32 bits, the length of the rate indicator field is four bits, and the length of the CRC is four bits. The address field comprises a 32-bit Access Address, AA. The receiver may use the 32-bit AA to detect whether it receives a valid frame and whether it is the intended receiver. The rate indicator field indicates the rate mode of the payload section 206 following the address and rate section. It may also indicate whether there are pilot symbols inserted into the payload section or not. The CRC field is used to protect the AR field. As the AR field is so important, a channel code is applied to the address and rate section.

In an embodiment, a Convolutional Code, CC, having a constraint length of 4 bits may be used to code the address and rate section 204. In such a case, the memory length of this CC is 3 and the encoder trellis has 8 states.

Typically, the address field is at the beginning of the address and rate section, followed with rate indicator field and CRC field. Traditionally in such a case, the CC encoder starts from state zero and it will add three bits after the CRC to terminate the CC encoder at the state zero. These added three bits are called as the tail bits. FIG. 5 illustrates an example of a possible encoder structure. The bit stream b(i) 500 is the input to the encoder 502. The encoder comprises three state registers S2, S1 and S0. The state registers are shift registers and they are always updated when a new bit comes into the encoder. At the beginning, the state registers have zeroes as the initial values, i.e. S0=0, S1=0 and S2=0. At the output of the encoder are the coded outputs D2 and D1. For one input bit, two output bits are generated by the encoder.

In an embodiment, the address and rate section 204 is formed without the three tail bits. Instead, the address field is split into two separate parts 400A, 400B. At the beginning of the address and rate section 204 there is the first part 400A of the address field, followed by the rate indicator field 402 and the CRC field 404. The second part 400B of the address field is located after the CRC field 404. The first part of the address field comprises the beginning of the address and the second part of the address field comprises the last bits of the address of the recipient.

With this structure of the address and rate section 204, the decoder at the receiving end will have the knowledge of what should be the end state of the encoder. Therefore, the three tail bits are not needed, and no energy is used to send the encoded tail bits.

Removal of the tail bits will as such reduce the reliability of the last three bits in the CRC. However, this can be solved by replacing the initial values of S0, S1 and S2 with bits based on bits in the second part of the address field. By selecting the bits such, the minimum hamming distance between the two coded output bit streams is six for the given example of the CC encoder, which is the same as the traditional solution using the tail bits.

Tables 1 and 2 illustrate examples of possible initialization of the registers of the encoder based on the on bits in the second part of the address field. AA(29:31) denote the three last bits of the second part of the address field.

TABLE 1

| AA(29:31) | S0 S1 S2 |
|---|---|
| 000 | 001 |
| 001 | 010 |
| 010 | 011 |
| 011 | 100 |
| 100 | 101 |
| 101 | 110 |
| 110 | 111 |
| 111 | 000 |

TABLE 2

| AA(29:31) | S0 S1 S2 |
|---|---|
| 000 | 000 |
| 001 | 001 |
| 010 | 010 |
| 011 | 011 |
| 100 | 100 |
| 101 | 101 |
| 110 | 110 |
| 111 | 111 |

In Bluetooth® communication, Carrier Sense Multiple Access with Collision Detection (CSMA/CD) and backoff is not utilized in channel access. This applies both to Basic Rate and BLE systems. This may be a cause for Co-Channel Interference, CCI. It may be possible that several devices, for example BLE devices, may transmit at the same frequency channel in the overlapped time period. Thus, in such a situation if an undesired signal arrives at the BLE receiver, it may lock the synchronization engine of the receiver. In this case, the receiver can only unlock the synchronization engine after it decodes the address field and recognizes it is not the intended recipient. In a situation, if an interfering BLE device has a similar address field as that of the desired one, the receiver may take longer time to unlock its synchronization engine and a packet loss may happen if a desired packet arrives during this decoding period. This may be denoted as a false synchronization problem due to CCI.

When the proposed address and rate section 204 is applied, the worst case of the false synchronization problem may happen when the two transmitting devices use otherwise the same address, AA, but with a 1-bit difference at AA(28). This means that the two AAs have the same content AA(0:27) and AA(29:31). Therefore, until the receiver knows the value of AA(28), its synchronization engine cannot be totally unlocked.

However, it is possible to reduce the false synchronization probability by applying a dynamic training sequence assignment scheme, which is described in following.

To achieve a high throughput in a BLE system, a training sequence pool is proposed. The pool has several training sequences that have good cross-correlation property with each other. As mentioned above, Zadoff-Chu sequences are an example of suitable sequences. In Zadoff-Chu sequences, there are 7 this kind of sequences, i.e.

$$S_k = e^{i\pi\frac{k(k+1)}{17}},\ S_k = e^{i\pi\frac{2k(k+1)}{17}},\ S_k = e^{i\pi\frac{3k(k+1)}{17}},\ S_k = e^{i\pi\frac{5k(k+1)}{17}},\ S_k = e^{i\pi\frac{7k(k+1)}{17}},\ S_k = e^{i\pi\frac{11k(k+1)}{17}} \text{ and } S_k = e^{i\pi\frac{13k(k+1)}{17}}.$$

It is known that the normalized cross-correlation sum of these sequences is guaranteed to be $\sqrt{1/17}$. It is possible to add another training sequence $$S_k = e^{i\pi\frac{9k(k+1)}{17}},$$

whose maximum normalized cross-correlation sum to other training sequences $\sqrt{2/17}$, which is still low enough. Thus, a pool with eight training sequences is obtained.

Consider a situation where two terminal devices establish a link utilising BLE. After the link is established, they are configured to select a training sequence from the pool of sequences. In an embodiment, the training sequence may be based on the Access Address, AA. For example, AA(26:28), or bits 26-28 of AA, may be used, because the 3 bit AA portion corresponds to the eight training sequence options in the pool. In BLE, each separate channel is uniquely identified by its channel ID. In an embodiment, the channel ID of the connection between the two terminal devices may also be taken into account in the selection of the training sequence. In such a case, the same AA(26:28) at different hopping channels chooses will lead to a different training sequence from the pool. In an example of a mapping function mapping the Access Address and channel ID, ChID, to a training sequence index K is as follows:

$$K = \mathrm{mod}(AA(26)\times 4 + AA(27)\times 2 + AA(28) + ChID,\ 8)$$

The index K will thus have a value between 0 to 7 and point to a training sequence in the pool of training sequences. After establishing the link, before the transmitting and receiving, the communicating terminal devices may be configured to calculate the index K for example via the above equation. Then the devices configure its transmitter/receivers to use the specified training sequence to transmit/receiver packets. It may be noted that the provided equation is merely an example.

FIG. 6 illustrates an example of the structure of the payload 206. The figure illustrates an example where packet aggregation is utilized. In packet aggregation, the payload section comprises multiple short packets 600A, 600B, 600C. In an embodiment, the packets may be intended to a same user but they may also be intended to be received by different users.

In traditional solution, each packet comprises payload, CRC and three tail bits. However, in an embodiment, the tail bits are left out, like in connection with address and rate section 204. In such a case each packet comprises only payload and CRC.

The proposed format saves the energy by not sending the encoded tail bits. However, it does not terminate the trellis to a state that is known by the decoder.

As mentioned above, the decoder may use AA(29:31) in connection with address and rate section in the to terminate the trellis because AA(29:31) is known by the receiver. However, in the payload section there is no certain information that can be known by the receiver beforehand. Therefore, a change is proposed to the receiver and decoder implementation. To decode the encoded payload by a convolutional decoder, Viterbi decoder may be used. Traditionally, Viterbi and CRC calculator are run independently at the receiver. As in the proposed solution there are no tail bits available, the proposed receiver comprises a feedback loop from CRC calculator to the Viterbi. The reason to make the change is that the end state of the coded payload is the last three bits of the CRC field. Providing the CRC is at least 24 bit or even increased to 32 bit in BLE high data rate throughput specification, CRC calculator already gets the result of the CRC value so that the Viterbi may know the value of the end state from the feedback loop.

The Viterbi can get the end state information in time, based on a simple calculation. Assume here that the considered decoder in the BLE long range specification has 3-bit state registers. To optimally decode the stream, Viterbi needs certain trace back memory internally and the memory length is usually five times three, i.e. equal to 15. Thus, the decoding delay introduced by the Viterbi is 15 bits. However, since the CRC has 24 bits, longer than the decoding delay, it guarantees that the CRC calculator already gets the result and is able to pass it to the Viterbi.

FIG. 7A illustrates an example of the structure of an arrangement 700 for processing a frame at the receiver side.

As an input to the arrangement are the payload 702 from digital front end, training sequence 704 and access address 706. The payload is taken to synchronisation block SYNC 708, where synchronisation is obtained utilising the training sequence 704. The signal is further taken to demodulator DEMOD 710 and derate matching RM 712, from which the signal is taken to convolutional decoder DECOD 714.

In an embodiment, the access address 706 is provided to initialisation unit INT 716, which provides initialisation data to the shift registers of the convolutional decoder DECOD 714. The output of the decoder is provided via the switch 718 either to CRC-4 checker 720 or CRC-24 checker 722. From the latter, MAC payload 724 is obtained as an output. The former has also as an input the access address 706, and output data is provided to access address and rate indicator checker AA&RI CHK 726, which provides rate switching information to rate switching unit RS 728. The rate switching unit 728 provides rate information to demodulator 710 and de-rate matching 712.

A feedback 730 from the CRC-24 checker 722 is provided to the convolutional decoder 714 as mentioned above.

Figure 7B:
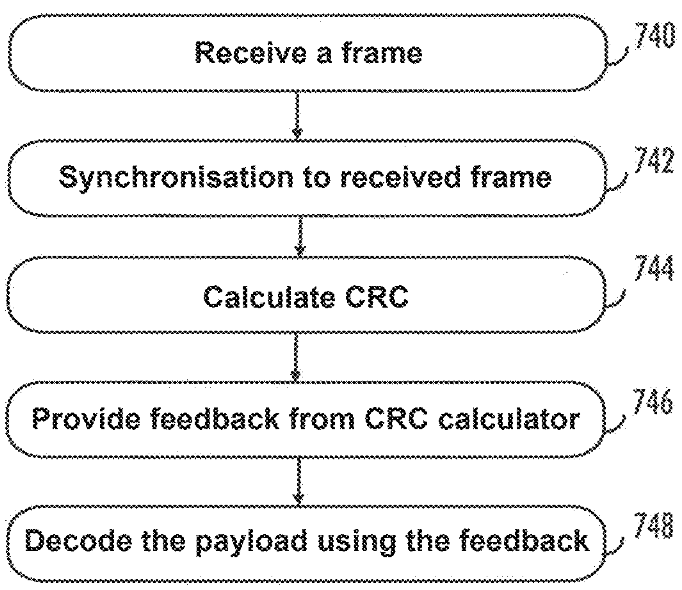
FIG. 7B is a flowchart illustrates the operation of a receiver.

FIG. 7B is a flowchart illustrating the operation of a receiver.

In step 740, the receiver is configured to receive a frame, where the frame comprises a header section, a training sequence section, address and rate section, and a payload section, the payload section consisting of a payload field with one or more packets and a cyclic redundancy check field after each packet.

In step 742, the receiver is configured to obtain synchronisation to the received frame utilising the training sequence section comprising a given number of first fields of equal length and a second field, where the total length of the given number of the first fields is shorter or equal than the length of the second field, the second field comprising a given symbol sequence, and the first field comprising a part of the same given symbol sequence.

In step 744, the receiver is configured to calculate the cyclic redundancy check in a cyclic redundancy check calculator.

In step 746, the receiver is configured to provide a feedback from the cyclic redundancy check calculator to a convolutional decoder.

In step 748, the receiver is configured to decode the payload in the convolutional decoder utilising the feedback.

Figure 8:
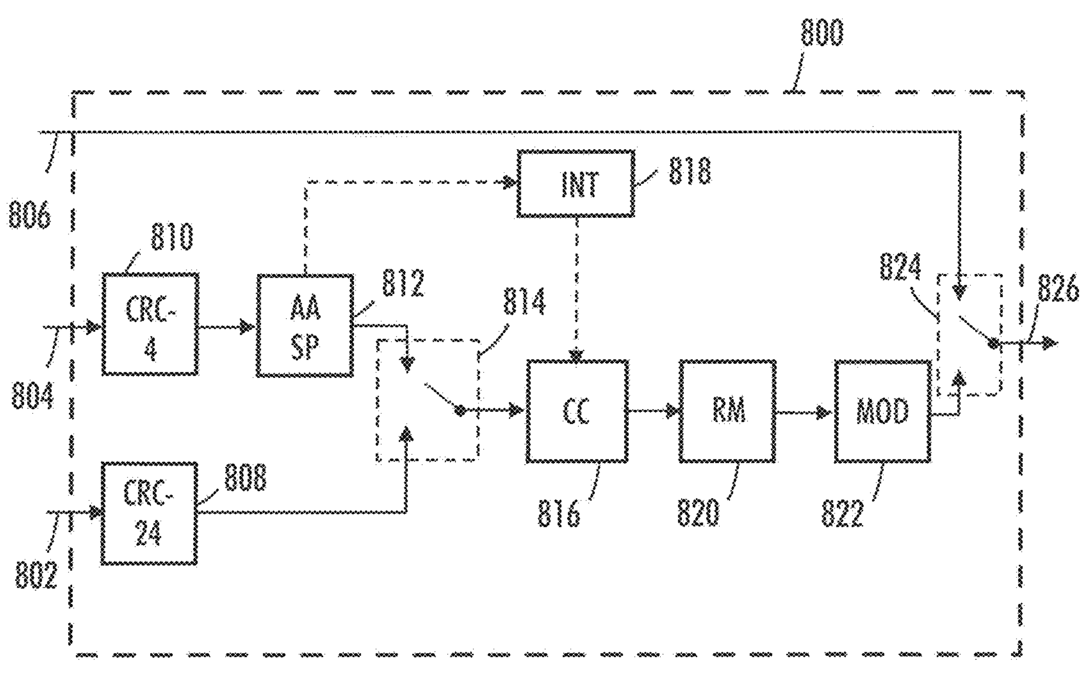
FIG. 8 illustrates an example of an arrangement for processing a frame at transmitting side.

FIG. 8 illustrates an example of the structure of an arrangement 800 for processing a frame at the transmitter side.

As an input to the arrangement are the MAC payload 802, access address and rate indicator 804 and training sequence 806. The payload is taken to CRC-24 insertion 808, where 24 bit CRC is added to payload packets. The access address and rate indicator 804 are taken to CRC-4 insertion 810, where bit CRC is added. The access address and rate indicator are taken to access address split block AA SP 812, where the access address is split into two parts, as described above. The end part is provided to initialisation block INT 818.

The payload and access address and rate indicator data are taken via switch 814 to convolutional encoder CC 816, which gets its initialisation from the initialisation block INT 818. The coded signal is taken to rate matching RM 820 and finally to the modulation block MOD 822. The modulated signal with the training sequence 806 is provided via switch 824 to digital front end (not shown).

Figure 9:
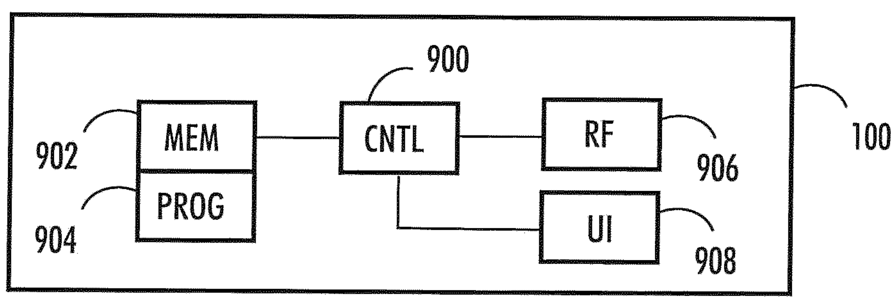
FIG. 9 illustrates an embodiment of an apparatus.

FIG. 9 illustrates an embodiment. The figure illustrates a simplified example of an apparatus applying embodiments of the invention. In some embodiments, the apparatus may be a terminal device 100, 102, 104, or a part of a terminal device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 100 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus may comprise one or more interface circuitries 906, 908. The interface circuitries are operationally connected to the control circuitry 900. An interface circuitry 906 may be a set of transceivers configured to communicate with a RAN node, such as an (e/g)NodeB of a wireless communication network, or communicate utilising Bluetooth® communication with another terminal device or accessories. The interface circuitry may be connected to an antenna arrangement (not shown). The apparatus may also comprise a connection to a transmitter instead of a transceiver. The apparatus may further comprise a user interface 908.

In an embodiment, the software 904 may comprise a computer program comprising program code adapted to cause the control circuitry 900 of the apparatus to control the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to one or more of the following: hardware-only circuit implementations such as implementations in only analogue and/or digital circuitry; combinations of hardware circuits and software and/or firmware; and circuits such as a microprocessor(s) or a portion of a microprocessor(s) that require software or firmware for operation, even if the software or firmware is not physically present. This definition of 'circuitry' applies to uses of this term in this application. As a further example, as used in this application, the term "circuitry" would also cover an implementation of merely a processor (or multiple processors) or portion of a processor, e.g. one core of a multi-core processor, and accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The protocols used, the specifications of the systems and their elements develop rapidly. Such development may require extra changes to the described embodiments. Therefore, all words and expressions should be interpreted broadly, and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. A data transmission method, comprising:

forming a frame for transmission, where the frame comprises a header section, a training sequence section, an address and rate section, and a payload section, the training sequence section comprising a given number of first fields of equal length and a second field, where the total length of the given number of the first fields is shorter than or equal to the length of the second field, the second field comprising a given Zadoff-Chu symbol sequence, and the first field comprising a part of the same given Zadoff-Chu symbol sequence, the first fields comprising the last symbols of the Zadoff-Chu sequence of the second field and thereby act as a cyclic prefix to the second field, and selecting the Zadoff-Chu sequence to be used on a connection from a pool of Zadoff-Chu sequences based on the address and rate section and channel identification of the connection.

2. The method of claim 1, wherein the payload section consists of a payload field with one or more packets and a cyclic redundancy check field in each packet.

3. The method of claim 1, wherein the payload section comprises more than one packet, at least some packets directed to different recipients.

4. The method of claim 1, wherein the payload section is coded using a convolutional encoder.

5. The method of claim 1, further comprising encoding the payload section, and transmitting the formed frame.

6. A data reception method, comprising:

receiving a frame, where the frame comprises a header section, a training sequence section, address and rate section, and a payload section, the payload section consisting of a payload field with one or more packets and a cyclic redundancy check field after each packet, obtaining synchronisation to the received frame utilising the training sequence section comprising a given number of first fields of equal length and a second field, where the total length of the given number of the first fields is shorter than or equal to the length of the second field, the second field comprising a given Zadoff-Chu symbol sequence, and the first field comprising a part of the same given Zadoff-Chu symbol sequence, wherein the first fields comprise the last symbols of the Zadoff-Chu sequence of the second field and thereby act as a cyclic prefix to the second field, selecting the Zadoff-Chu sequence to be used on a connection from a pool of Zadoff-Chu sequences based on the address and rate section and channel identification of the connection, calculating the cyclic redundancy check in a cyclic redundancy check calculator, providing a feedback from the cyclic redundancy check calculator to a convolutional decoder, and decoding the payload in the convolutional decoder utilising the feedback.

7. The method of claim 6, wherein a given number of last bits of the value of the cyclic redundancy check is fed back to the convolutional decoder.

8. A transmitter, comprising at least one processor;

at least one memory including computer program code;

the at least one memory and the computer program code configured to, with the at least one processor, cause the apparatus at least to perform:

forming a frame for transmission, where the frame comprises a header section, a training sequence section, address and rate section, and a payload section, forming the training sequence section comprising a given number of first fields of equal length and a second field, where the total length of the given number of the first fields is shorter than or equal to the length of the second field, the second field comprising a given Zadoff-Chu symbol sequence, and the first field comprising a part of the same given Zadoff-Chu symbol sequence, wherein the first fields comprise the last symbols of the Zadoff-Chu sequence of the second field and thereby act as a cyclic prefix to the second field, and selecting the Zadoff-Chu sequence to be used on a connection from a pool of Zadoff-Chu sequences based on the address and rate section and channel identification of the connection.

9. The transmitter of claim 8, wherein the at least one memory and the computer program code configured to, with the at least one processor, cause the apparatus further to perform: forming a payload section consisting of payload field with one or more packets and a cyclic redundancy check field in each packet.

10. The transmitter of claim 8, wherein the at least one memory and the computer program code configured to, with the at least one processor, cause the apparatus further to perform: encoding the payload section, and transmitting the formed frame.

11. A receiver, comprising at least one processor;

at least one memory including computer program code;

the at least one memory and the computer program code configured to, with the at least one processor, cause the apparatus at least to perform:

receiving a frame, where the frame comprises a header section, a training sequence section, address and rate section, and a payload section, the payload section consisting of a payload field with one or more packets and a cyclic redundancy check field after each packet, obtaining synchronisation to the received frame utilising the training sequence section comprising a given number of first fields of equal length and a second field, where the total length of the given number of the first fields is shorter than or equal to the length of the second field, the second field comprising a given Zadoff-Chu symbol sequence, and the first field comprising a part of the same given Zadoff-Chu symbol sequence, wherein the first fields comprise the last symbols of the Zadoff-Chu sequence of the second field and thereby act as a cyclic prefix to the second field, selecting the Zadoff-Chu sequence to be used on a connection from a pool of Zadoff-Chu sequences based on the address and rate section and channel identification of the connection, calculating the cyclic redundancy check in a cyclic redundancy check calculator, providing a feedback from the cyclic redundancy check calculator to a convolutional decoder, and decoding the payload in the convolutional decoder utilising the feedback.

* * * * *